(12) United States Patent
Ide

(10) Patent No.: US 7,623,967 B2
(45) Date of Patent: Nov. 24, 2009

(54) DEVICE AND METHOD FOR DETECTING COLLISION OF VEHICLE

(75) Inventor: Seiya Ide, Okazaki (JP)

(73) Assignee: Denso Corporation, Kariya (JP)

( * ) Notice: Subject to any disclaimer, the term of this patent is extended or adjusted under 35 U.S.C. 154(b) by 565 days.

(21) Appl. No.: 11/440,985

(22) Filed: May 25, 2006

(65) Prior Publication Data
US 2006/0276965 A1 Dec. 7, 2006

(30) Foreign Application Priority Data
Jun. 3, 2005 (JP) ............................. 2005-164249

(51) Int. Cl.
G08G 1/16 (2006.01)

(52) U.S. Cl. .................... 701/301; 701/45; 701/300; 701/302; 340/435; 340/436; 340/438

(58) Field of Classification Search ............... 701/301, 701/302, 300, 45; 340/435, 436, 438
See application file for complete search history.

(56) References Cited

U.S. PATENT DOCUMENTS

| | | | | |
|---|---|---|---|---|
| 5,748,075 A * | 5/1998 | Dirmeyer et al. | ............ | 340/436 |
| 5,974,892 A * | 11/1999 | Swart et al. | .................... | 73/714 |
| 6,434,456 B1 * | 8/2002 | Babala et al. | ................. | 701/34 |
| 6,877,357 B2 * | 4/2005 | Herrmann et al. | ............ | 73/1.71 |
| 6,885,966 B1 * | 4/2005 | Tyroller et al. | ............. | 702/138 |
| 7,025,163 B2 * | 4/2006 | Fuertsch et al. | ............. | 180/274 |
| 2003/0127270 A1 * | 7/2003 | Mattes et al. | ............... | 180/274 |
| 2004/0134256 A1 | 7/2004 | Herrmann et al. | | |
| 2005/0055146 A1 | 3/2005 | Ide | | |
| 2006/0052924 A1 * | 3/2006 | Prakah-Asante et al. | ...... | 701/45 |
| 2006/0095183 A1 * | 5/2006 | Schuller et al. | ............... | 701/45 |
| 2006/0124378 A1 * | 6/2006 | Recknagel | .................. | 180/274 |

FOREIGN PATENT DOCUMENTS

DE 196 19 468 8/1997

OTHER PUBLICATIONS

Anonymous: "Pressure Based Adaptive Threshold Side Impact Sensor", Research Disclosure, Mason Publications, Hampshire, GB, vol. 384, No. 23, Apr. 1996, SP 007121002, ISSN: 0374-4353.
Search Report dated Oct. 6, 2006 in corresponding European Application No. 06011010.3.

* cited by examiner

*Primary Examiner*—Khoi Tran
*Assistant Examiner*—Jonathan Sample
(74) *Attorney, Agent, or Firm*—Harness, Dickey & Pierce, PLC (57) ABSTRACT

A method for detecting a collision of a vehicle based on an output value of a pressure sensor for detecting change of a pressure in an interior space of the vehicle, includes: a process for calculating an environmental pressure around the vehicle; a process for correcting a pressure value determined based on the output value of the pressure sensor in accordance with the calculated environmental pressure; and a process for determining whether the corrected pressure value exceeds a predetermined threshold.

19 Claims, 3 Drawing Sheets

DEVICE AND METHOD FOR DETECTING COLLISION OF VEHICLE

CROSS REFERENCE TO RELATED APPLICATION

This application is based on and incorporates herein by reference Japanese patent application No. 2005-164249 filed on Jun. 3, 2005.

FIELD OF THE INVENTION

The present invention relates to a device and a method for detecting a collision of a vehicle.

BACKGROUND OF THE INVENTION

A front collision of one vehicle colliding with another vehicle is generally detected by an acceleration sensor located in a front portion or a middle portion of the one vehicle. Acceleration of the one vehicle changes rapidly during the collision and the acceleration sensor hence detects the rapid change of the acceleration. When it is determined based on the detection of the acceleration sensor that the collision has occurred, a passenger protection device such as an air bag or a pretensioner device of a seat belt may be activated to protect a passenger from the collision.

A lateral collision of one vehicle sometimes occurs in which a front portion of another vehicle collides with a lateral side portion (for example, a door) of the one vehicle. When another vehicle collides with a relatively softer portion of the one vehicle than a pillar of the one vehicle, the change of the acceleration is not so significant. Therefore in this case, it is difficult to detect the collision by using the acceleration sensor.

A pressure sensor may be located in an interior space of a door of the vehicle. When the lateral impact collision has occurred, a pressure in the interior space of the door rapidly changes in a short period. The pressure sensor hence detects the rapid change of the pressure. An environmental pressure around the vehicle changes depending on height above sea level, and the interior space is not airtight in may cases. The pressure in the interior space therefore slowly changes in accordance with the environmental pressure (also referred to as a surrounding pressure). It is hence necessary to take into account change of the environmental pressures in order to detect the collision by using a pressure sensor detecting an absolute pressure.

JP 2004-508558A (corresponding to U.S. Pat. No. 6,885,966) discloses a pressure sensor for generating a signal which depends on the change of the environmental pressure, and a signal processing unit which is connected with a rear side of the pressure sensor. In the prior art, it is supposed that the pressure changes within a range from 97 percents of 600 hPa to 120 percents of 1200 hPa provided that the environmental pressure changes within the range from 600 hPa to 1200 hPa. Thus, a pressure within the range from 582 hPa to 1440 hPa is detected by the pressure sensor.

In the prior art, a threshold used for determining whether the collision has occurred varies depending on the environmental pressure. For example, the environmental pressure is set to th1 when the environmental pressure is a1, and the environmental pressure is set to th2 ($\neq$th1) when the environmental pressure is a2 ($\neq$a1). In the case that the environmental pressure is a1, it is determined that the collision has occurred when an output value of the pressure sensor exceeds the threshold th1. In the case that the environmental pressure is a2, it is determined that the collision has occurred when the output value exceeds the threshold th2. However in this prior art, the threshold must vary among many values and different comparisons between the output value and the threshold are made depending on the varying threshold.

SUMMARY OF THE INVENTION

The present invention is made in view of above problems. It is an object of the present invention to provide a method and a device for correctly detecting by means of a pressure sensor a collision of a vehicle even in a situation with a varying environmental pressure.

According to a first aspect of the present invention, a method for detecting a collision of a vehicle based on an output value of a pressure sensor for detecting change of a pressure in an interior space of the vehicle includes: a process for calculating an environmental pressure around the vehicle based on detection of the pressure sensor; a process for correcting, based on the calculated environmental pressure, a pressure value determined based on the output value of the pressure sensor; and a process for determining whether the corrected pressure value exceeds a predetermined threshold.

The method of the first aspect may include the process for correcting the determined pressure value of the pressure sensor based on the environment pressure, after the environmental pressure is calculated. Therefore, the collision can be detected by using a common threshold which is independent of the environmental pressure.

In addition, the method may further include a process for comparing the determined pressure value of the pressure sensor with an upper limit value which is determined based on the calculated environmental value. In this case, the output value may be corrected in the process for correcting when the determined pressure value of the pressure sensor is smaller than the upper limit value.

In this case, the method includes the process for comparing the determined pressure value of the pressure sensor with the upper limit value. The determined pressure value therefore is not taken into account in the process for determining, when electrical noise is outputted from the pressure sensor. Thus, an erroneous detection of the collision is suppressed.

According to a second aspect of the present invention, a device for detecting a collision of a vehicle includes a pressure sensor for detecting change of a pressure in an interior space of the vehicle, and a control circuit. The control circuit includes: a calculation section for calculating an environmental pressure around the vehicle; a correcting section which corrects, based on the calculated environmental pressure, a pressure value determined based on an output value of the pressure sensor; and a determination section which determines whether the corrected pressure value exceeds a predetermined threshold.

The device of the second aspect corrects the determined pressure value based on the environment pressure which is obtained in advance. Therefore, the collision can be detected by using a common threshold which is independent of the environmental pressure.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

First Embodiment

Hereafter, the first embodiment of the present invention will be described with reference to FIGS. 1-3.

(i) Structure

Figure 1:
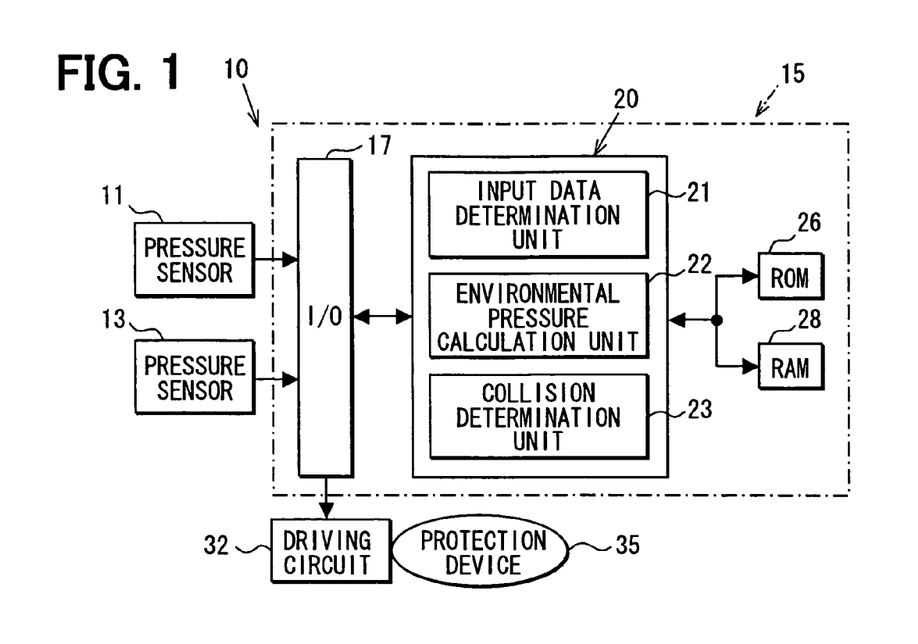
FIG. 1 is a schematic diagram showing structure of a collision detection device of a first embodiment of the present invention.
Figure 2:
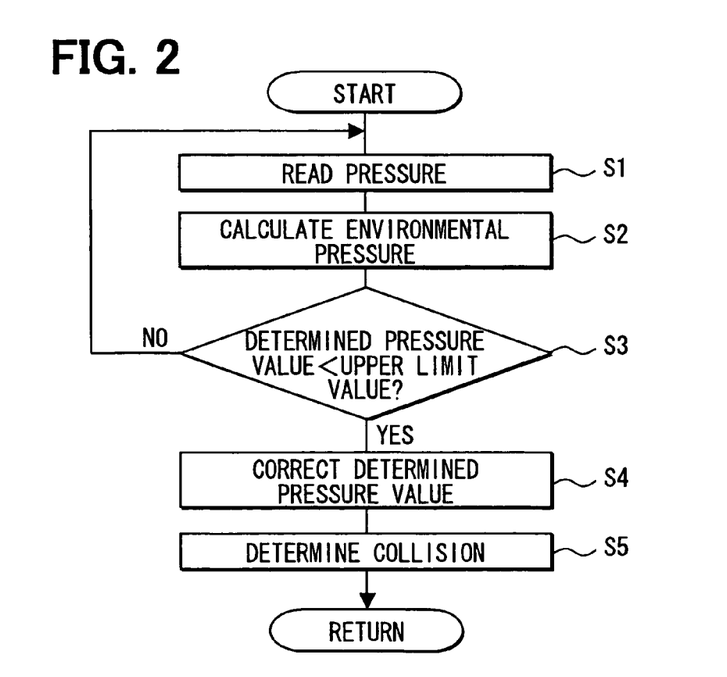
FIG. 2 is a flowchart showing an operation of the first embodiment.

FIG. 1 shows a collision detection device 10 and a passenger protection device 35. The collision detection device 10 includes a left side pressure sensor 11, a right side pressure sensor 13 and a control circuit 15. The left side pressure sensor 11 is located in an interior space of a left side door of a vehicle and the right side pressure sensor 13 is located in an interior space of a right side door of the vehicle. Each of the pressure sensors 11 and 13 may be a semiconductor pressure sensor in which a strain gauge is formed on a diaphragm made of silicon. Each of output values outputted by the pressure sensors 11 and 13 is a sum of a component corresponding to the environmental pressure and a component corresponding to the pressure caused by the collision. The electrical noise may also be included in the output values The control circuit 15 includes an input/output circuit 17, a determination circuit 20, a ROM 26 and a RAM 28. The input/output circuit 17 receives/sends signals from/to the left side pressure sensor 11, the right side pressure sensor 13 and the determination circuit 20. The determination circuit 20 includes an input data determination unit 21, an environmental pressure calculation unit 22 and a collision determination unit 23.

The input data determination unit 21 executes processes for the output values from the pressure sensors 11 and 13. For example, the input data determination unit 21 calculates or determines a determined pressure value. The determined pressure value is a value determined based on a group of the outputs of the pressure sensors 11 and 13 and is a value showing a representative or typical characteristics of the group. For example, the determined pressure value may be a resultant value of wave form shaping (for example, filtering, averaging, or integration) of the output values of the pressure sensors 11 and 13. In the case that integration is made for the output values in a limited interval, the result of the integration becomes an average value in the limited interval (for example, 5 milliseconds). The determined pressure value may be equal to an output value from one of the pressure sensors 11 and 13.

The environmental pressure calculation unit 22 calculates an environmental pressure based on signals which are outputted within a period (for example 1 minute) by the left side pressure sensor 11 and the right side pressure sensor 13. The input data determination unit 21 and the environmental pressure calculation unit 22 may be installed in the pressure sensors 11 and 13.

The collision determination unit 23 has a comparison function, an amplification function and a determination function. The comparison function is for comparing the calculated determined pressure value of the output values with an upper limit value. The upper limit value is a sum of the calculated environmental pressure and a tolerance value.

The tolerance value is determined through actual collision experiments, so that no realistic collision can change output values from the pressure sensors 11 and 13 by an amount equal to or more than the tolerance value.

The tolerance value varies depending on the calculated environmental pressure. The environmental pressure becomes 1013 hPa at 0 meter above the sea level. The environmental pressure at 5000 meters above the sea level becomes 500 hPa, which is about a half of the environmental pressure at 0 meter above the sea level. The environmental pressure at 2500 meters above the sea level becomes 750 hPa, which is about three quarters of the environmental pressure at 0 meter above the sea level. Provided that pressure change in an interior space of a door caused by the collision at 0 meter above the sea level is within a range from about 200 hPa to about 300 hPa, pressure change in the interior space caused by the collision with the same magnitude at 5000 meters or 2500 meters above the sea level is within a range from about 100 hPa to about 150 hPa or a range from about 150 hPa to about 225 hPa, respectively.

In view of this, the tolerance value varies, for example, in proportion to the calculated environmental pressure. In this case, the tolerance value may be set to 300 hPa at 0 meter (1013 hPa) above the sea level and 150 hPa at 5000 meters (500 hPa) above the sea level. The collision determination unit 23 may include a comparator for the comparison function.

The amplification function is for amplifying the outputs from the pressure sensors 11 and 13. The collision determination unit 23 may include an amplifier for the amplification function, a gain of which depends on the calculated environmental pressure. For example, the gain varies in inverse proportion to the calculated environmental pressure. In this case, the gain may be 1 at 0 meter (1013 hPa) above the sea level and 2 at 5000 meters (500 hPa) above the sea level.

The determination function is for determining whether a collision has occurred or not, based on the output from the input data determination unit 21 and the environmental pressure calculation unit 22. The collision determination unit 23 may include a comparator for the determination function.

The ROM 26 stores data indicating the tolerance value and the gain. The ROM 26 also stores a threshold value used in the collision determination unit 23 for the determination function. The RAM 28 serves for several kinds of calculations and for receiving/sending several kinds of data.

The input/output circuit 17 is connected with a driving circuit 32, which activates the passenger protection device 35. The passenger protection device 35 may be an air bag device or a pretensioner device which include a squib and an inflator. The driving circuit 32 may be composed of transistors or FETs for activating the squib and is further a circuit for generating a redundant signal.

(ii) Operation

Next, an operation of the determination circuit 20 will be described with reference to FIGS. 2 and 3. At step S1 in the flowchart in FIG. 2, the input/output circuit 17 reads pressure data detected by the left and right side pressure sensors 11 and 13.

At step S2, the environmental pressure calculation unit 22 calculates based on the read pressure data an environmental pressure of a place where the vehicle is currently traveling. As described above, the calculation of the environmental pressure is made based on the pressure data read within a period (for example, 1 minute).

More specifically, the environmental pressure calculation unit 22 generates a signal (for example, a voltage signal) based on pressure values detected by the pressure sensors 11 and 13. As a result, the signal is generated with a voltage proportional to the calculated environmental pressure. For example, the generated signal has a voltage $V_3$ shown in FIG. 3 when the vehicle is at a place 0 meter (1013 hPa) above the sea level and has a voltage $V_1$ shown in FIG. 3 which is lower than the voltage $V_3$ when the vehicle is at a place 5000 meters (500 hPa) above the sea level.

In the case that there is a large difference between the pressure values detected by the left and right pressure sensors 11 and 13, the higher pressure may be ignored, because it is likely a result of electrical noise of one of the pressure sensors 11 and 13. In contrast, when there is a small difference between the pressure values detected by the left and right pressure sensors 11 and 13, the difference is, in many cases, caused by an individual difference between the pressure sensors 11 and 13 or an overtaking action of the vehicle. Therefore in this case, for example, an average of both of the pressure values may be used to calculate the environmental pressure.

Subsequently at step S3, the collision determination unit 23 determines, by using its comparator, whether the determined pressure value is smaller than the upper limit value. The operation of the collision determination unit 23 corresponds to the comparison function. As described above, the determined pressure value is calculated or determined based on the output values of the sensors 11 and 13 by the input data determination unit 21. The determined pressure value is affected not only by slow change of the environmental pressure but also by sudden change of pressures in the interior spaces caused by the collision and by sudden change caused by electrical noise. The upper limit value is used for distinguishing the sudden change caused by the collision from the sudden change caused by the electrical noise. As described before, the upper limit is determined based on the calculated environmental pressure.

For example, the environmental pressure at 0 meter above the sea level is 1013 hPa. The environmental pressure at 5000 meters above the sea level is 750 hPa, which is about a half of the environmental pressure at 0 meter above the sea level. The environmental pressure at 2500 meters above the sea level is 500 hPa, which is about three quarters of the environmental pressure at 0 meter above the sea level. Provided that pressure change in an interior space of a door caused by the collision at 0 meter above the sea level is within a range from about 200 hPa to about 300 hPa, pressure change in the interior space caused by the collision with the same magnitude at 5000 meters or 2500 meters above the sea level is within a range from about 100 hPa to about 150 hPa or a range from about 150 hPa to about 225 hPa, respectively.

When it is determined, as a result of the comparison function, that the determined pressure value is larger (for example 230 hPa) than the upper limit value (225 hPa) at 2500 meters above the sea level, it is a case that electrical noise has been likely generated in the left side pressure sensor 11 or right side pressure sensor 13. The operation of the determination circuit 20 accordingly returns to step S1. In other words, the determined pressure value is not corrected and is not used in determining the collision.

When the determined pressure value is, as a result of the comparison function, smaller (for example 220 hPa) than the upper limit value (225 hPa) at 2500 meters above the sea level, it is a case that electrical noise has been unlikely generated in the pressure sensor 11 or right side pressure sensor 13. The operation accordingly goes to step S4 and the collision determination unit 23 amplifies, by using the amplifier, the determined pressure values of the pressure sensors 11 and 13. The operation of the collision determination unit 23 corresponds to the amplification function described before.

Figure 3:
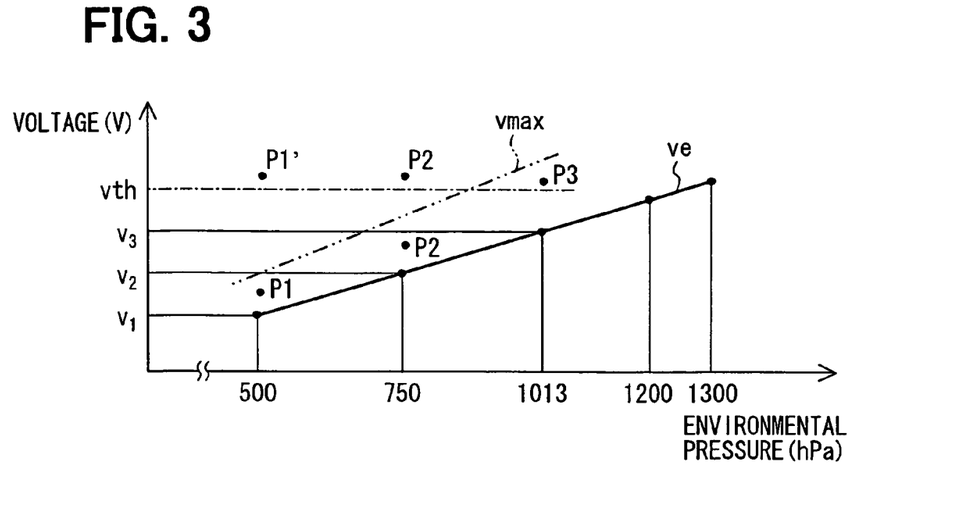
FIG. 3 is a graph showing an effect of the first embodiment.

In FIG. 3, where the environmental pressure (hPa) corresponds to the horizontal axis and the voltage (V) corresponds to the vertical axis, a voltage corresponding to the environmental pressure is plotted by a solid line ve and a voltage corresponding to the upper limit value is plotted by a double-dashed line vmax. In the case that the environmental pressure is normal (i.e. 1013 hPa), the determined pressure value p3 is amplified by 1 to be an amplified value. In this case, the amplified value is between the threshold value vth and the upper limit value vmax. In the case that the vehicle is at a place 2500 meters above the sea level and the determined pressure value p2 is smaller than the upper limit value vmax, the determined pressure value p2 is amplified by 1.33 to be the amplified value p2', which can be larger than the threshold value vth. In the case that the vehicle is at a place 5000 meters above the sea level and the determined pressure value p1 is smaller than the upper limit value vmax, the determined pressure value p1 is amplified by 2 to be the amplified value p1' which can be larger than the threshold value vth.

In step S5, the collision determination unit 23 determines, by using its comparator, whether the collision has occurred, based on the amplified value and the threshold value stored in the ROM 26. The operation of the collision determination unit 23 corresponds to the determination function. In the case that the amplified (or corrected) value exceeds the threshold value, it is likely that the collision has occurred. Therefore in this case, the determination circuit 20 sends, through the input/output circuit 17 to driving circuit 32, a command to make the driving circuit 32 activate the passenger protection device 35.

When the left side pressure sensor 11 or the right side pressure sensor 13 outputs the electrical noise at a place where the environmental pressure is 750 hPa or 500 hPa, the determined pressure value is not amplified and therefore the determination regarding the collision is not made, because the upper limit value is 225 hPa or 150 hPa.

In the case that the collision has occurred at a place where the environmental pressure is 1013 hPa, that the pressure in an interior space has changed by 200 hPa, and that the input data determination unit 21 calculates the determined pressure value as an average of four output values from the pressure sensors 11 and 13, the determined pressure value changes by 50 hPa to be 1013 hPa+200 hPa/4=1063 hPa. In the case that the threshold value is 1040 hPa, the collision determination unit 23 determines that the collision has occurred.

In the case that the collision has occurred at a place where the environmental pressure is 750 hPa, that the pressure in an interior space has changed by 150 hPa and that the input data determination unit 21 calculates the determined pressure value as an average of four output values from the pressure sensors 11 and 13, the average changes to be 750 hPa+150 hPa/4=788 hPa, which is multiplied by 1.33 to the amplified value of 1050 hPa. In the case that the threshold value is 1040 hPa, the collision determination unit 23 determines that the collision has occurred.

In the case that the collision has occurred at a place where the environmental pressure is 500 hPa, that the pressure in an interior space has changed by 100 hPa and that the input data determination unit 21 calculates the determined pressure value as an average of four output values from the pressure sensors 11 and 13, the average of four samples changes to be 500 hPa+100 hPa/4=525 hPa, which is multiplied to be 525 hPa×2=1050 hPa. In the case that the threshold value is 1040 hPa, the collision determination unit 23 determines that the collision has occurred.

In contrast, the device in the previously described conventional art does not have an upper limit value of a range in which the pressure sensor is used and determines different thresholds for different environmental pressures. In the case that the output of the pressure sensor reaches a maximum value (e.g. 1300 hPa) for just a moment because of the electrical noise, that the environmental pressure is normal (1013 hPa), that a sampling frequency is 2 kHz, and that a sampling period is 5 ms, an average of ten sets of data is calculated to be about 1013 hPa+(1300 hPa−1013 hPa)/10=1042 hPa.

In the case that the environmental pressure is 500 hPa, an average of ten sets of data is calculated to be about (500 hPa×(1300 hPa−500 hPa)/10)×2=1320 hPa, which exceeds a threshold (for example, 1200 hPa) normally used for determining the collision. Thus, when the pressure sensor outputs a maximum rated value for just a moment because of the electrical noise, it is likely that the collision is erroneously detected.

(iii) Effect

According to the first embodiment, advantages are achieved as follows. First, it is possible to determine whether the collision has occurred by using a common (single) threshold at any place with low or high height above the sea level. For example, a common threshold of 1050 hPa can be used for the collision at 0 meter (1013 hpa), 2500 meters (750 hPa) and 5000 meters (500 hpa) above the sea level. As a result, it becomes easy to determine whether the collision has occurred. In addition, the collision determination unit 23 can be used and increase of cost is therefore suppressed.

Second, erroneous determination caused by the electrical noise can be avoided, although the determined pressure value is amplified. This is because the determined pressure value is not amplified and is not used for determination of the collision irrespective of height above the sea level, when the electrical noise is generated and the determined pressure value is larger than or the same as the upper limit value.

<First Modification>

Significant change in the output values from the pressure sensors 11 and 13 may be caused by not only the electrical noise but also by the collision. In view of this, the determination circuit 20 may operate according to the flowchart shown in FIG. 4. In the flowchart, when it is determined at step S13 that the determined pressure value is larger than the upper limit value, the determined pressure value is set to the upper limit value at step S14. In this case, by reducing at step S15 the determined pressure value (which is equal to the upper limit value) by the gain (factor) less than 1, an air bag is not opened in the determination of the collision at step S16.

This process prevents the electrical noise (if any) from disturbing the later determination of the collision in the case that an output range within which the pressure sensor outputs is not limited (for example 500 hPa to 1300 hPa) and that the maximum output value of the pressure change becomes 800 hPa at 5000 meters above the sea level with the environmental pressure of 500 hPa.

Figure 4:
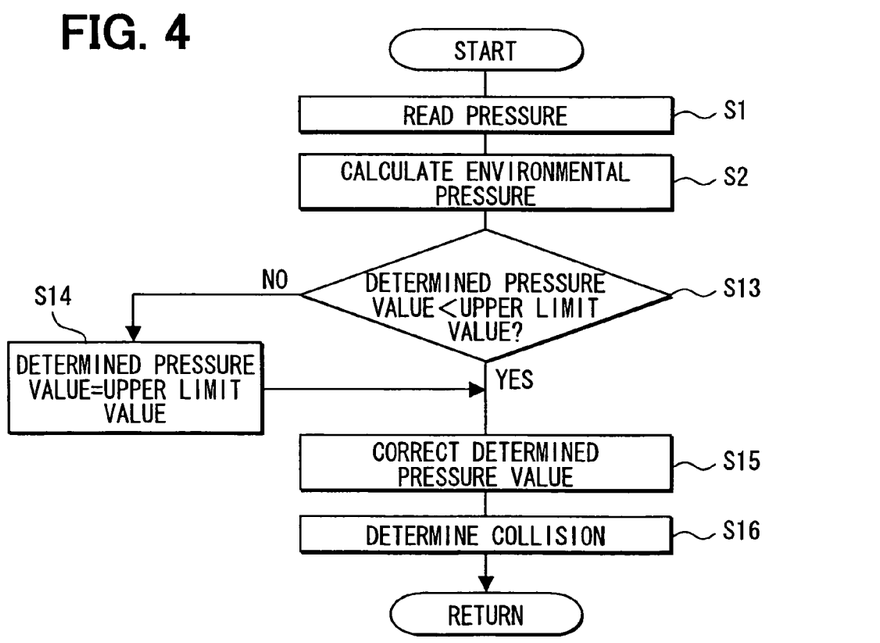
FIG. 4 is a flowchart showing an operation of a first modification of the first embodiment.

When the determined pressure value is set to the upper limit value twice in a row at step S14, it may be determined at subsequent step S16 that the collision has occurred. In contrast, when the determined pressure value which is newly calculated is smaller than the upper limit value and the determined pressure value which is previously calculated is set to the upper limit value, that is, when the upper limit value is outputted just once inconsecutively, it is determined at step S16 that the electrical noise has been generated. With this operation, in addition to the effects of the first embodiment, it is possible to determine surely whether the collision has occurred even if the determined pressure value larger than the experimentally obtained upper limit value is calculated.

<Second Modification>

Figure 5:
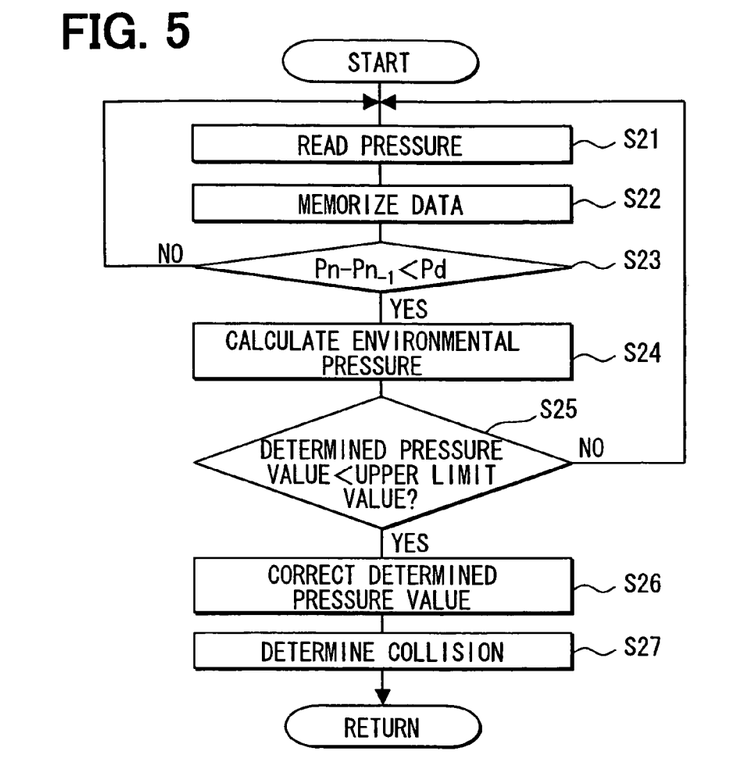
FIG. 5 is a flowchart showing an operation of a second modification of the first embodiment.

In the second modification of the first embodiment shown in FIG. 5, the determination circuit 20 makes a determination regarding a change rate of the output values from the pressure sensors 11 and 13, before calculating the environmental pressure. For this operation, step S22 for memorizing the output values and step S23 for comparison are made after reading the pressure from the pressure sensors 11 and 13 at step S21. At step S22, the output values are memorized every time. At step S23, it is judged by the determination circuit 20 whether a difference $(p_n - p_n - 1)$ between the output value $p_n$ of this time and the output value $p_{n-1}$ of the previous time is larger than a predetermined value $p_d$.

When the difference between the output value $p_n$ of this time and the output value $p_{n-1}$ of the previous time is smaller than the predetermined value $p_d$, it is unlikely that the electrical noise is generated. In this case, the environmental pressure is accordingly calculated at step S24, the determined pressure value and the upper limit value are compared with each other at step S25, and the determined pressure value is corrected (amplified) at step S26. In contrast, when the difference between the output value $p_n$ of this time and the output value $p_{n-1}$ of the previous time is larger than or the same as the predetermined value $p_d$, it is likely that the electrical noise is generated. In this case, the operation is accordingly returned to step S21 without calculation of the environmental pressure.

In the second example of modification, the determined pressure value is compared with the upper limit value, based on the determination that the change rate of the output value is smaller than the predetermined value. With this operation, in addition to the effects of the first embodiment, it is possible to determine the upper limit value and the gain with high accuracy based on the environmental pressure, because the environmental pressure is calculated correctly. As a result, it is determined with high accuracy whether the collision has occurred.

Second Embodiment

Figure 6:
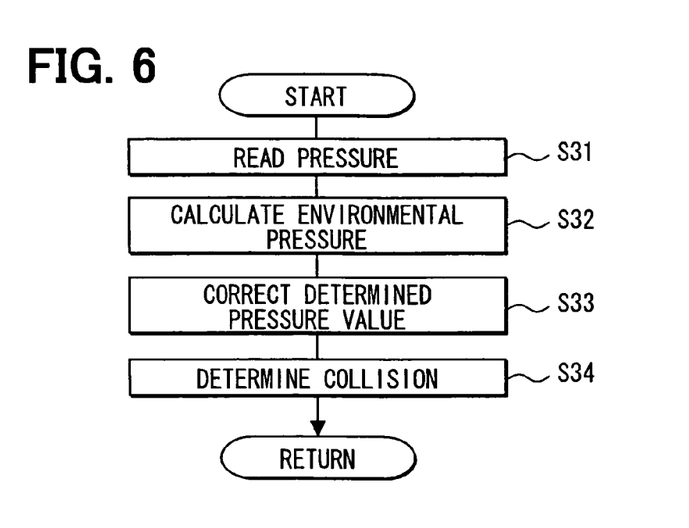
FIG. 6 is a flowchart showing an operation of a second embodiment of the present invention.

The operation of the determination circuit 20 according to the second embodiment of the present invention is shown in a flowchart in FIG. 6. The operation of the second embodiment includes a calculation process (calculation section), a correction process (correction section) and a determination process (determination section). More specifically, the environmental pressure is calculated at steps S31 and S32 based on output values from the pressure sensors 11 and 13. Subsequently at step S33, the determined pressure value based on the output values is corrected based on the calculated environmental pressure. A method to correct the determined pressure value is the same as that of the first embodiment. More specifically, the gain used in the correction is increased as the height above the sea level increases and the environmental pressure gets smaller relative to a normal state corresponding to the environmental pressure at 0 meter above the sea level.

Subsequently at step S34, the collision determination unit 23 determines whether the corrected determined pressure value (that is, the amplified value) is larger than a predetermined reference value. In this case, the determination is made by using a common (single) threshold that is independent of the environmental pressure which varies depending on the height above the sea level.

The present invention should not be limited to the embodiment discussed above and shown in the figures, but may be implemented in various ways without departing from the spirit of the invention.

For example, a single pressure sensor may be located only in the left side door or the right side door of the vehicle. Otherwise, more than two pressure sensors may be located in the interior spaces. In this case, the environmental pressure calculation unit 22 may use, as the environmental pressure, a pressure value which is most dominant in number in a plurality of the pressure values from the pressure sensors.

The environmental pressure rapidly increases when the vehicle runs into a tunnel with a high velocity. However, in this case, change rate of the pressure is smaller than that in the case of the collisions and both of the environment pressures detected by the left and right pressure sensors 11 and 13 change at the same time. The change of the environmental pressure caused by running into the tunnel is therefore can be distinguished from the change of the environmental pressure caused by the collision. Thus, the collision detecting method of the present invention may include a process for determining whether a change rate of an environmental pressure detected by a pressure sensor is smaller than predetermined values. The present invention may also include a process for determining whether a difference between the environmental pressures detected by the multiple pressure sensors is smaller than predetermined values.

In the amplification function, the collision determination unit 23 may amplify the determined pressure value with a large factor (equal to or more than 1) at height higher than 0 meter above the sea level and reduce the determined pressure value with a small factor (less than 1) at height lower than 0 meter above the sea level.

For example, at 0 meter above the sea level, it is determined that the collision has occurred, when the pressure sensor detects a pressure equal to or more than 1200 hPa (a component corresponding to the environmental pressure 1000 hPa+a component corresponding to pressure change caused by the collision 200 hPa)

The collision detecting method of the present invention may include, after the comparison process and before the correction process, a process for setting the output value of the pressure sensor to the upper limit value when the output value is not smaller than the upper limit value.

In the case that the input data determination unit 21 stores information indicating the calculated determined pressure value into a limited data space (for example, a data space of 8 bits) in the RAM 28, a value range within which the data space is capable of expressing the determined pressure value may vary depending on the calculated environment pressure.

For example, the input data determination unit 21 may store into the data space an offset value indicating a difference between the determined pressure value and the calculated environmental pressure. The offset value in the data space is corrected (that is, amplified or reduced) and then compared with a relative threshold value, which is a difference between the threshold value and the normal environmental pressure (that is, 1013 hPa). In this case, the uppermost value and the lowermost value of the value range is set so that the value range includes the relative threshold value and values near the relative threshold value.

Thus, the value range becomes narrower than a range from 500 hPa to 1200 hPa, and therefore the determined pressure value expressed in the data space can have a sufficient resolution. In other words, a range of the determined pressure values is limited based on the calculated environmental pressure. The resolution performance of the collision determination unit 23 is therefore improved and it is possible to determine whether the collision has occurred with higher accuracy.

In contrast, if the value range is as wide as the range from 500 hPa to 1200 hPa, the determined pressure value expressed in the data space tend to have insufficient resolution.

Such changes and modifications are to be understood as being within the scope of the present invention as defined by the appended claims.

What is claimed is:

1. A method for detecting a collision of a vehicle based on an output value of a pressure sensor for detecting a change of a pressure in an interior space of the vehicle, the method comprising:

calculating an environmental pressure around the vehicle based on a detection of the pressure sensor;

correcting, based on the calculated environmental pressure, a pressure value determined based on the output value of the pressure sensor;

determining whether the corrected pressure value exceeds a predetermined threshold; and comparing the determined pressure value with an upper limit value which is different than the predetermined threshold and which is determined based on the calculated environmental pressure;

wherein the determined pressure value is corrected in the correcting step when the determined pressure value of the pressure sensor is smaller than the upper limit value.

2. The method according to claim 1, wherein the correcting includes:

amplifying the determined pressure value of the pressure sensor by a first factor which becomes larger as the calculated environmental pressure becomes smaller in a case that the calculated environmental pressure is smaller than an environmental pressure in a normal state; and reducing the determined pressure value of the pressure sensor by a second factor which becomes smaller as the calculated environmental pressure becomes larger in a case that the calculated environmental pressure is larger than the environmental pressure in the normal state.

3. The method according to claim 2, wherein the first factor is equal to or larger than 1 and the second factor is smaller than 1.

4. The method according to claim 1, wherein the upper limit value in the comparing is determined so as to become smaller as the calculated environmental pressure becomes smaller in a case that the calculated environmental pressure is smaller than an environmental pressure in a normal state and to becomes larger as the calculated environmental pressure becomes larger in a case that the calculated environmental pressure is larger than the environmental pressure in the normal state.

5. The method according to claim 1, further comprising a process for setting, after the comparing step and before the correcting step, the determined pressure value to the upper limit value when the determined pressure value is not smaller than the upper limit value.

6. The method according to claim 1, further comprising a process for judging, prior to the calculating step, whether a change rate of an environmental pressure detected by the pressure sensor is smaller than a predetermined value, wherein in the determining step it is determined whether the corrected pressure value exceeds the predetermined threshold, when the change rate is smaller than the predetermined value.

7. The method according to claim 1, further comprising a process for determining whether a difference value is smaller than a predetermined value, the difference value being a difference between an environmental pressure detected by the pressure sensor and another environmental pressure detected by another pressure sensor, wherein in the determining step it is determined whether the corrected pressure value exceeds the predetermined threshold, when the difference value is larger than a predetermined value.

8. The method according to claim 1, wherein the process for calculating calculates, as the environmental pressure around the vehicle, an average of a plurality of environmental pressures detected by a plurality of pressure sensors including the pressure sensor.

9. The method according to claim 1, wherein the process for calculating calculates, as the environmental pressure around the vehicle, one of a plurality of environmental pressures detected by a plurality of pressure sensors including the pressure sensor, the one being most dominant in number in the plurality of the environmental pressures.

10. A device for detecting a collision of a vehicle, the device comprising:
 a pressure sensor for detecting a change of a pressure in an interior space of the vehicle; and
 a control circuit which includes:
  a calculating section which calculates an environmental pressure around the vehicle;
  a correcting section which corrects, based on the calculated environmental pressure, a pressure value determined based on an output value of the pressure sensor; and
  a determination section which determines whether the corrected pressure value exceeds a predetermined threshold; wherein
 the control unit further comprises a comparing section for comparing the determined pressure value with an upper limit value which is different than the predetermined threshold and which is determined based on the calculated environmental pressure; and
 the determined pressure value is corrected by the correcting section when the determined pressure value of the pressure sensor is smaller than the upper limit value.

11. The device according to claim 10, wherein:
 the correcting section amplifies the determined pressure value of the pressure sensor by a first factor which becomes larger as the calculated environmental pressure becomes smaller in a case that the calculated environmental pressure is smaller than an environmental pressure in a normal state; and
 the correcting section reduces the determined pressure value of the pressure sensor by a second factor which becomes smaller as the calculated environmental pressure becomes larger in a case that the calculated environmental pressure is larger than the environmental pressure in the normal state.

12. The method according to claim 1, wherein when the determined pressure value of the pressure sensor is equal to or larger than the upper limit value, the determined pressure value is not corrected and is not used in the correcting step and the determining step.

13. The method according to claim 1, wherein the upper limit value is a sum of the calculated environmental pressure and a tolerance value determined through actual collision experiments.

14. The method according to claim 1, wherein the determined pressure value is corrected to be equal to the upper limit value.

15. The device according to claim 10, wherein when the determined pressure value of the pressure sensor is equal to or larger than the upper limit value, the determined pressure value is not corrected and is not used in the correcting section and the determination section.

16. The device according to claim 10, wherein the upper limit value is a sum of the calculated environmental pressure and a tolerance value determined through actual collision experiments.

17. The device according to claim 10, wherein the determined pressure value is corrected to be equal to the upper limit value.

18. A method for detecting a collision of a vehicle based on an output value of a pressure sensor for detecting a change of a pressure in an interior space of the vehicle, the method comprising: calculating an environmental pressure around the vehicle based on a detection of the pressure sensor; multiplying a pressure value determined based on the output value of the pressure sensor by a gain value, the gain value being based on the calculated environmental pressure; determining whether the corrected pressure value exceeds a predetermined threshold; and comparing the determined pressure value with an upper limit value which is different than the predetermined threshold and which is determined based on the calculated environmental pressure; wherein the determined pressure value is corrected in the correcting step when the determined pressure value of the pressure sensor is smaller than the upper limit value.

19. The method according to claim 18, wherein the determined pressure value is corrected to be equal to the upper limit value.

* * * * *

UNITED STATES PATENT AND TRADEMARK OFFICE
CERTIFICATE OF CORRECTION

PATENT NO.       : 7,623,967 B2                                           Page 1 of 1
APPLICATION NO. : 11/440985
DATED            : November 24, 2009
INVENTOR(S)      : Seiya Ide It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 743 days.

Signed and Sealed this

Twenty-sixth Day of October, 2010

David J. Kappos
*Director of the United States Patent and Trademark Office*